United States Patent [19]

Lapeyre

[11] Patent Number: 4,934,517
[45] Date of Patent: Jun. 19, 1990

[54] HORIZONTAL FLEXING CONVEYOR BELT
[75] Inventor: James M. Lapeyre, New Orleans, La.
[73] Assignee: The Laitram Corporation, Harahan, La.
[21] Appl. No.: 270,101
[22] Filed: Nov. 14, 1988
[51] Int. Cl.⁵ ............................................. B65G 17/06
[52] U.S. Cl. .................................... 198/852; 198/831
[58] Field of Search ........................ 198/831, 852, 853
[56] References Cited

U.S. PATENT DOCUMENTS

| 3,870,141 | 3/1975 | Lapeyre et al. | 198/853 |
| 4,213,527 | 7/1980 | Lapeyre et al. | 198/853 |
| 4,226,980 | 7/1981 | Oizumi | 198/853 |
| 4,557,374 | 12/1985 | Bode | 198/852 |

*Primary Examiner*—Joseph E. Valenza
*Attorney, Agent, or Firm*—James C. Kesterson

[57] ABSTRACT

A modular plastic belt which can be constructed to have any length or width, and which can flex horizontally in any direction is disclosed. In the preferred embodiment, each of the modules forming the belt includes a multiplicity of elongated links extending between first and second pluralities of link ends. At least one of the link ends on each elongated link defines an elongated pivot aperture, and in the preferred embodiment both apertures on each link are elongated. The elongated links are joined together by a pair of transverse connecting structures integrally formed with the bottom and top surfaces of the elongated links. The pair of transverse connecting structures are located such that the end-most portion of a link end of a first module pivotally connected to the first pluralities of link ends of a second module can simultaneously move past the end-most portion of a link end of a third module pivotally connected to the second plurality of link ends of the second module.

47 Claims, 8 Drawing Sheets

HORIZONTAL FLEXING CONVEYOR BELT

TECHNICAL FIELD

This invention relates to conveyor belts which can flex or change their horizontal direction and more particularly to such a conveyor belt which includes a plurality of individual modules joined together by pivot rods. The modules are the type preferably formed by injection molding and which include a first and second plurality of pivot ends which are intermeshed with pivot ends of other modules and are held together by means of pivot rods. The particular belt of this invention, can be driven by any suitable means, including means for driving the belt at the center of the pitch line of each module. In addition, the belt could also be driven by other known means, including a technique wherein the belt operates as the armature of a linear motor.

BACKGROUND

A typical modular conveyor belt is disclosed in U.S. Pat. No. 3,870,141 issued to J. M. Lapeyre on Mar. 11, 1975. According to this patent, substantially identical modules formed by injection molding are pivotally connected to one another to form a conveyor belt of a desired length. Each module includes a plurality of elongated elements, and each elongated element has a first pivot end and a second pivot end. The plurality of elongated elements are joined together since the apertures defined in each of the first and second pluralities of pivot ends lie along a first and second pivot axis respectively. The first and second pivot axes are parallel one to the other. The link ends of one module are intermeshed and pivotally connected by means of a pivot rod to the link ends of another module until an entire belt having the desired length and width is formed. Injection molded plastic belts built according to the teachings of this patent have been well received by industry and have many uses. U.S. Pat. No. 4,051,949 also issued to J. M. Lapeyre on Oct. 4, 1977 and discloses a belt similar to that of the 3,870,141 except it includes "raised ribs" which work in conjunction with a comb for the transfer of objects to and from the belt.

U.S. Pat. No. 4,171,045 issued on Oct. 16, 1979 also to J. M. Lapeyre, recognized the need for including a conveyor surface which would not allow objects riding on the conveying surface to slip and thereby allow the belt to pass underneath. A belt disclosed and constructed according to the teachings of the U.S. Pat. No. 4,171,045, is similar to that of the U.S. Pat. No. 4,051,949 discussed heretofore except that selective ones of the elongated members include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J. M. Lapeyre, et al further discloses a module for forming a link conveyor belt which has ridges or flight members extending transverse to the direction of travel for preventing the conveyor belt from slipping under articles riding on the conveyor belt surface. Similarly U.S. Pat. No. 4,170,281 issued on Oct. 19, 1979 and U.S. Pat. No. 4,080,842 issued on Mar. 22, 1978, both to Lapeyre, also show conveying belts having members extending transverse to the conveying surface for moving articles on the conveying surface along the belt such that the belt cannot slip underneath the article. U.S. Pat. No. 4,084,687 issued Apr. 18, 1978 to J. M. Lapeyre discloses a conveyor belt patent not particularly relevant to the present invention wherein the top surface is resilient or flexible, and very slick. Other modular link conveyor belt patent applications or patents by J. M. Lapeyre and/or owned by the same assignee as the present invention include: Ser. No. 483,210 entitled "Link Chain Belt" filed Apr. 14, 1983; Ser. No. 179,523 entitled "Modular Center Drive Conveyor Belt" filed Aug. 19, 1980; and U.S. Pat. No. 4,556,142 entitled "Lightweight Modular Conveyor Belt" issued Dec. 3, 1985. In addition, a patent application entitled "End-to-End Molded Conveyor Belt Module" filed Oct. 15, 1987 and having Ser. No. 110,109 (now abandoned) discloses subject matter having some similarity to the present invention in that the modules of this invention may be "end-to-end" molded in a manner similar to that discussed in the earlier application. A conveyor belt designed particularly for changing horizontal directions or flexing is disclosed in U.S. Pat. Nos. 4,153,152 and 4,184,588 also issued to J. M. Lapeyre on May 8, 1979 and Jan. 22, 1980 respectively. Although the belt described in these patents has been proven to operate very satisfactorily, it has the disadvantage of not being brick-layable or adjustable in width. This belt also requires two different types of modules and two different types of pivot rods. In addition, U.S. Pat. No. 4,290,762 issued on Sept. 22, 1981 to J. M. Lapeyre teaches a side flexing plastic module transmission chain. However, it is believed that this device is even less relevant to the present invention than the Lapeyre U.S. Pat. Nos. 4,153,152 and 4,184,588.

The "All-In-One"(®) conveyor belt manufactured by the KVP Company in Sacramento, Calif. and illustrated in FIG. 4 of U.S. Pat. No. 4,742,907 issued May 10, 1988 to Karl V. Palmaer is a modular plastic belt which can be brick-layed and therefore can be provided in different widths. However, this belt cannot handle small items, does not have a very tight turning radius, and can be driven in only one direction.

Another plastic modular belt sold by the Cambridge Wire Cloth Company of Cambridge, Md. under the name of Cam-Clean(®) and substantially described in U.S. Pat. No. 4,557,374 issued on Dec. 10, 1985 to Robert H. Bode has enlarged pivot apertures which allows some minimal flexing. However, the minimum turning radius of the Cam-Clean II belt is so great that it is not even sold for that purpose. The '374 patent, however does describe an embodiment for that purpose.

There are various wire mesh, and flat wire belts sold by both the Cambridge Wire Cloth Company and Ashworth Brothers Incorporated of Falls River, Mass. which can flex or change horizontal direction and are specifically sold for such purposes. Examples of these type belts are disclosed in U.S. Pat. Nos. 2,872,023 to Bechtel, Jr.; 3,261,451; 3,920,117; and 4,078,655 to Roinestad, and have a turning radius substantially the same as the turning radius of the "All-In-One"(®) described above. The Ashworth company also produces a belt system which can make a very small turning radius and which they identify as their "Small Radius Composite Belt". This metal belt system although being able to accomplish a very small turning radius can only flex in one direction and is made up of two parallel belts each having a different pitch. Furthermore, all wire mesh and flat wire metal belts are very heavy, and do not have the advantage of a modular plastic belts in that a multiplicity of modules cannot be brick-layed so as to provide a belt of any desired width.

Finally, U.S. Pat. Nos. 3,368,662 and 3,651,924 issued to J. J. Poerink on Feb. 13, 1968 and Homeier, et al on Mar. 28, 1972 respectively, show metal belts which include a multiplicity of individual links on pivot rods which are parallel to each other and which links use one slot and one circular hole as apertures. These belts of course, have the disadvantage of time consuming construction, the heavy weight of the metal material, and a restricted turning radius.

Thus, a review of the prior art patents and commercial belts as well as pending applications of the assignee of the present invention reveals that to date there has not been a simple and inexpensive modular conveying belt particularly designed with the capability of being able to flex in both horizontal directions and which is brick-layable such that the belt may be constructed to any desired width and length. Therefore it is an object of this invention to provide a module which can be constructed into a "Radius" conveyor belt (i.e. a belt with horizontal flexing capabilities), which can be brick-layed, and which is simple and inexpensive to construct and use.

It is another object of the present invention to provide a simple and inexpensive module formed by injection molding which may easily be assembled into a belt and which horizontally flex in both directions.

It is still another object of the present invention to provide a module for forming a radius or horizontal flexing conveyor belt with a very small turning radius which is modular and has the inherent capability of being easily repaired and replaced.

It is yet another object of the present invention to provide modules for forming a radius conveyor belt, which is suitable for being driven by present and existing drive methods and is therefore retrofittable on existing equipment.

It is also an object of the present invention to provide a conveyor belt which can turn or flex in either horizontal direction which may be manufactured to custom widths, and which can cooperate with the teeth of a comb to transfer objects to and from the belt.

DISCLOSURE OF THE INVENTION

Other objects and advantages will be obvious, and will in part appear hereinafter and will be accomplished by the present invention which provides a module for forming a conveyor belt which can change its horizontal direction and which is formed of a plurality of modules which are pivotally connected. The modules are preferably formed by the injection molding of a plastic material such as polyethylene, polypropylene, nylon, acetal, or other suitable polymers. Each module has a top surface and a bottom surface and includes first and second pluralities of link ends joined by a connecting structure such as a traverse member integrally molded to one or both of the top and bottom surfaces. Each link end of the first and second pluralities of link ends defines a pivot aperture, and the pluralities of pivot apertures in turn define first and second pivot axes. In one embodiment, the pivot apertures defined by one of the pluralities of link ends are elongated. In another embodiment, the pivot apertures are elongated in both pluralities. The length of each module is determined by the length of the elongated link elements and the width of the module is determined by the number of elongated link elements joined together by the connecting portions such as top and bottom traverse members. Since the first and second pivot axes defined by the first and second pluralities of link ends are parallel, these axes lie in a common plane. The thickness of each of the pivot ends is less than the spacing between adjacent pivot ends so that the pivot ends of one module may be intermeshed and connected with the pivot ends of another module by means of a pivot rod when the pivot axis of the two modules are aligned coaxially.

In a preferred embodiment, the spacing between adjacent pivot ends is somewhat greater than twice the width of a pivot end such that the endmost portions of a pair of pivotally connected pivot ends can bypass each other. Selected ones of the modules (usually all) also include a means for receiving a driving force which is applied orthogonal or at least has a vector applied orthogonal to the pivot axis and substantially parallel to the common plane for purposes of moving such modules. Consequently, a belt formed of a plurality of modules will be moved in a direction perpendicular to the parallel pivot axis. For example, in one embodiment such a means for receiving the driving force may comprise a connecting structure or member which is integrally molded with the pivot ends about midway between the two pivot axes and which extends transverse to the pivot ends, such that it is suitable for cooperating with a recess formed in a sprocket drive wheel. Alternately, it also would, of course, be possible to form a multiplicity of teeth into the connecting structure of the module rather than a single tooth.

In addition, the connecting structure or transverse member of each of the modules is integrally formed and located with respect to the pluralities of link ends such that the end-most portion of a link end of at least one of the pluralities of link ends can partially pass the connecting structure. As mentioned above, in one preferred embodiment, the connecting structure comprises two cross-members located substantially midway between the two pivot axis and integrally molded to the top and bottom surface of the module respectively.

BRIEF DESCRIPTION OF THE DRAWING

The above features of the present invention will be more clearly understood from consideration of the following description in connection with accompanying drawings in which:

FIGS. 14 and 15 are top and side views of still another embodiment of this invention showing link ends having enlarged portions.

BEST MODE FOR CARRYING OUT THE INVENTION

Figure 1:
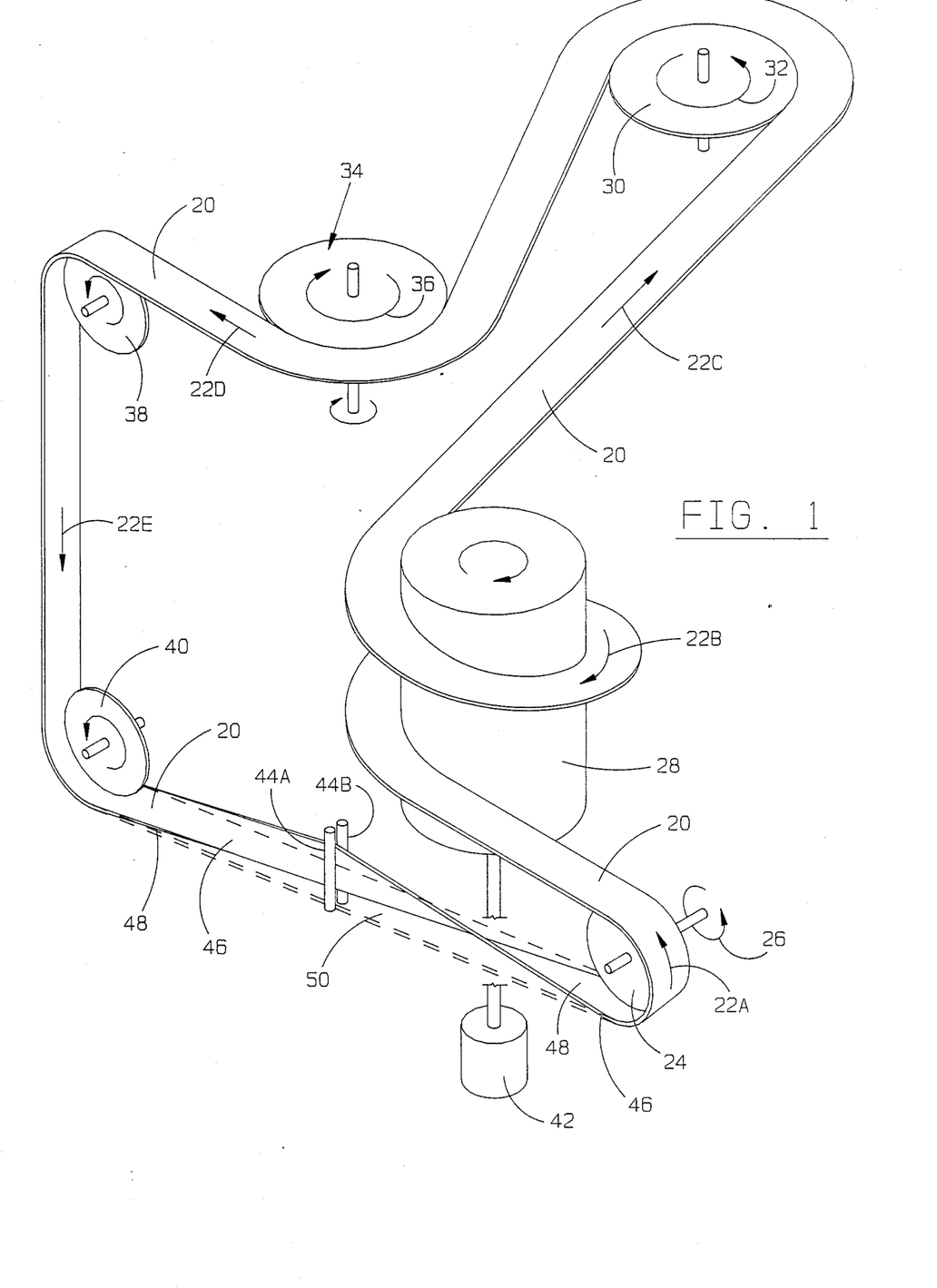
FIG. 1 a perspective sketch which illustrates how the conveyor belt of this invention can flex in both horizontal directions as well as in a vertical direction.

Referring now to FIG. 1 there is shown a perspective sketch which illustrates the horizontal and vertical flexing capabilities of the belt of the present invention. As shown, belt 20 follows a predetermined path as indicated by directional arrows 22A, 22B, 22C, 22D, and 22E. Also as shown, the belt 20 has the capability of flexing vertically as is indicated by belt 20 passing around sprocket 24. As indicated, sprocket 24 is revolving in the direction indicated by arcuate arrow 26. As a point on the belt 20 progresses from sprocket 24 it can be seen it travels in a helical path around drum 28 during which the belt 20 is required to flex in both a slightly vertical and in a clockwise horizontal direction. In the illustration of FIG. 1, belt 20 is shown having more than one complete wrap around drum 28. However, it will be appreciated by those skilled in the art, that in certain applications such as cooling or heating conveyors, the belt 20 may be required to travel in a helix around drum 28 many, many times. After completing its travel in a helical path around drum 28, belt 20 then travels in a straight line as indicted by directional arrow 22C to a wheel 30 where it flexes in only a counter-clockwise horizontal direction as indicated by arcuate directional arrow 32. Alternately the belt may spiral down a second drum before leaving tangentially at any desired level. Also indicated, as belt 20 passes around wheel 30 it encircles more than 180° of wheel 30. Belt 20 then continues until it encounters horizontal wheel 34 and changes its path in a clockwise direction as indicated by arcuate directional arrow 36. The belt then continues and flexes over a drive sprocket 38 in a vertical direction until it encounters another drive sprocket 40 where it again must flex in a vertical direction before proceeding back to its starting point at drive sprocket 24. Although various techniques of driving a belt as illustrated in FIG. 1 could be used, it is not unusual for drum 28 to impart some drive action to the belt 20 as indicated by drive motor 42. In addition, one or more of the drive sprockets 24, 38 and 40 may be used to provide drive power to belt 20. It may also be desirable to use thin drums as wheels 30 and 34 such that drive power could be imparted as belt changes its horizontal direction at these points but such use is not typical. Thus, it can be seen from the above description that the belt 20 has unique flexing capabilities in both the horizontal and vertical directions.

It will also be noticed that belt 20 passes a pair of vertical rollers 44A and 44B which allows the belt to be turned top to bottom for every complete revolution the belt makes around the predetermined path. More specifically, it can be seen that as belt 20 leaves drive sprocket 40 the belt is forced to start twisting as it approaches the parallel and vertical rollers 44A and 44B so that it can pass between these rollers. As the belt continues beyond vertical rollers 44A and 44B it then continues its twist in the same direction so that it can then pass around sprocket drive 24. However, as can be seen in the process of moving from drive sprocket 40 to drive sprocket 24, sides 46 and sides 48 of the belt are reversed such that each side can act as both a top surface and a bottom surface. Thus, in the embodiment shown it will be appreciated that the belt may achieve much longer wear since both belt surfaces act as both a support surface and a drive surface. It will also be appreciated of course that as the belt travels the distance between drive sprocket 40 to drive sprocket 24, it certinly is not necessary to use the twist just discussed (which turns the belt over once every revolution). It should be understood that the belt may take a more conventional path; that is, a straight path between drive sprockets 40 and 24 as indicated by the belt section 50 shown by phantom lines. If the belt takes the untwisted path, the top side always remains the top side or surface of the belt and the bottom side or surface always remains the bottom surface of the belt.

Figures 2, 3:
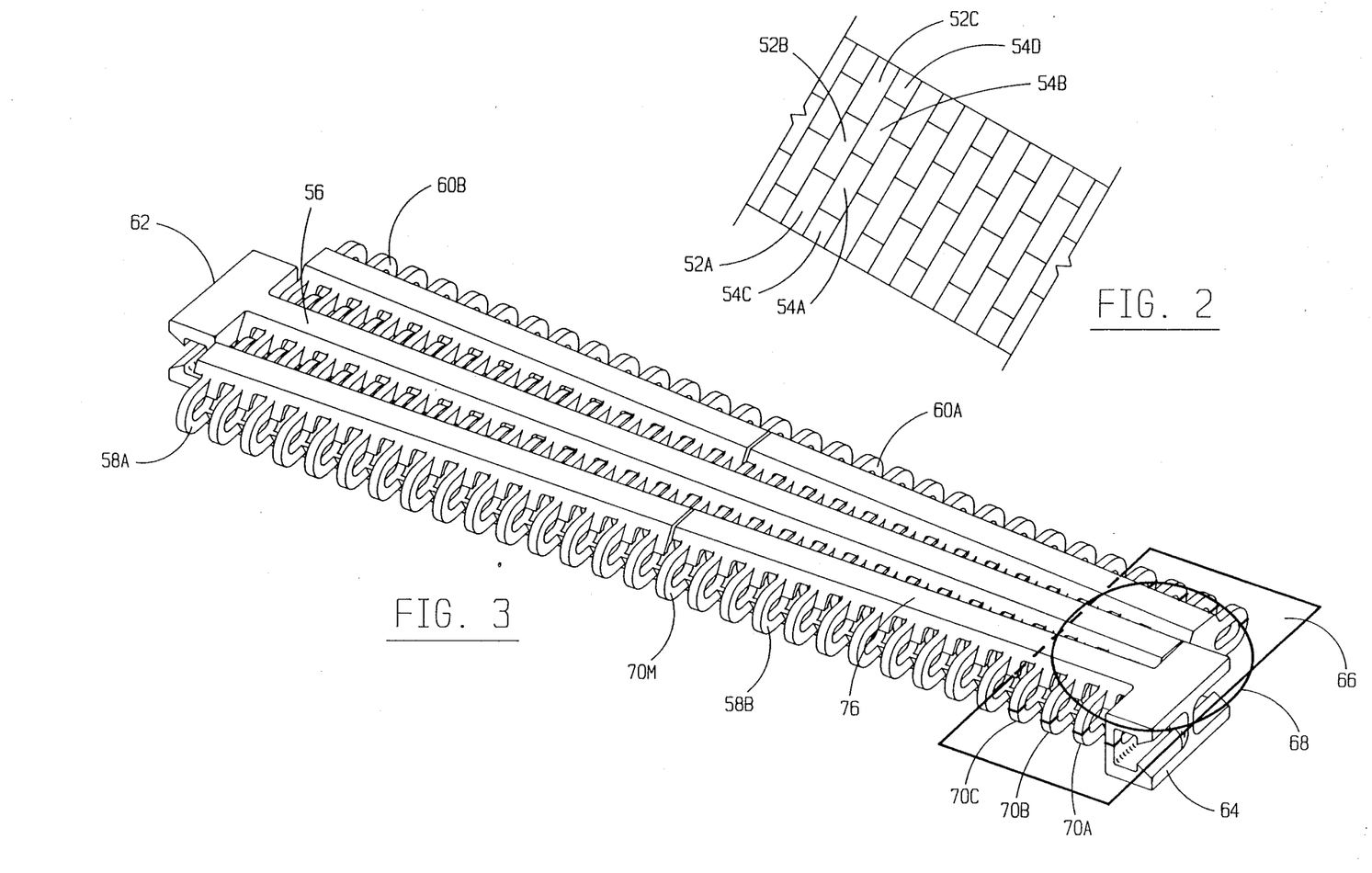
FIG. 2 is a diagramatic sketch showing how the belt of this invention may be brick-layed to form a belt of any selected width.
FIG. 3 is a perspective view of a preferred embodiment of three modules which are substantially similar except for their overall width and which are pivotally connected in a brick-layed fashion.

It will be understood, of course, by those skilled in the art that conveyor belts are required to be in all sizes of width and length to accomplish various types of conveying needs. These widths can vary between 6" to 60" for example. The need for such variations in width also, of course, exists for horizontal flexing belts such as shown in FIG. 1, as well as for straight running belts which have no side flexing or horizontal capabilities. Consequently, it is highly desireable that a belting system be made of modules or subdivisions thereof or units which can be placed together in an end-to-end and side-by-side relationship so as to form a belt of any width and length. FIG. 2 illustrates how a belt of the type shown in FIG. 1 may be made of identical modules having a single width along with a few half modules so as to form a belt three modules wide but which also has the strength of a single module across the belt. The strength of the belt is achieved as a result of the intermeshing and interlocking of the pivot ends. As shown, the full length modules 52A, 52B and 52C are simply laid side-by-side across the width of the belt. Each row on both sides of the modules comprised of modules 52A, 52B and 52C include two full size modules such as modules 54A and 54B and two half modules such as 54C and 54D. Thus the edge of each module, except for the edge of a module on the extreme end, is located at an intermediate point with its intermeshed modules in what is commonly referred to as brick-laid pattern. When this brick-laid pattern is continued for the length of the belt, the belt has substantially more strength across its width than it would without the brick-laying. However, as will also be appreciated by those skilled in the art, to obtain the advantages of a brick-laid belt while still maintaining the flexibility of single module belt has been a formidable challenge in the past.

Referring now to FIG. 3, there is shown a preferred embodiment of the present invention which takes advantage of both the brick-laying capabilities of a straight running modular plastic belt while losing none of the flexibility typically associated with a "Radius" belt which only has the width of a single module. The section of belt in FIG. 3 is shown having one full length module 56 and four half modules 58A, 58B, 60A, and 60B. Of course, in applications requiring a belt which was only as wide as single module 56, half modules such as modules 58A, 58B, 60A and 60B would not typically be used. However, use of such half (or other modular portions) modules would not materially weaken the belt and such use is shown in FIG. 3 to illustrate the interlacing capability of the belt. It will also be noted, that modules 56 and 58B include end structures 62 and 64 respectively. Although not necessary for proper operation of the belt, the end structures 62 and 64 are preferably used on selected modules at each side of the belt. End structures 62 and 64 serve to provide a wear surface when the belt makes horizontal changes of direction, and may also provide a means for transferring driving power from a source such as drum 28 in FIG. 1. The end structures 62 and 64 are shown in the embodiment of FIG. 3 as occuring at every third module row at each side of the belt. That is, every third row of modules on the side of the belt with end structure 64 will have a similar end structure and every third module on the side having end structure 62 will also have a similar structure. The reason for the every third module pattern will be discussed in detail hereinafter.

Figure 4:
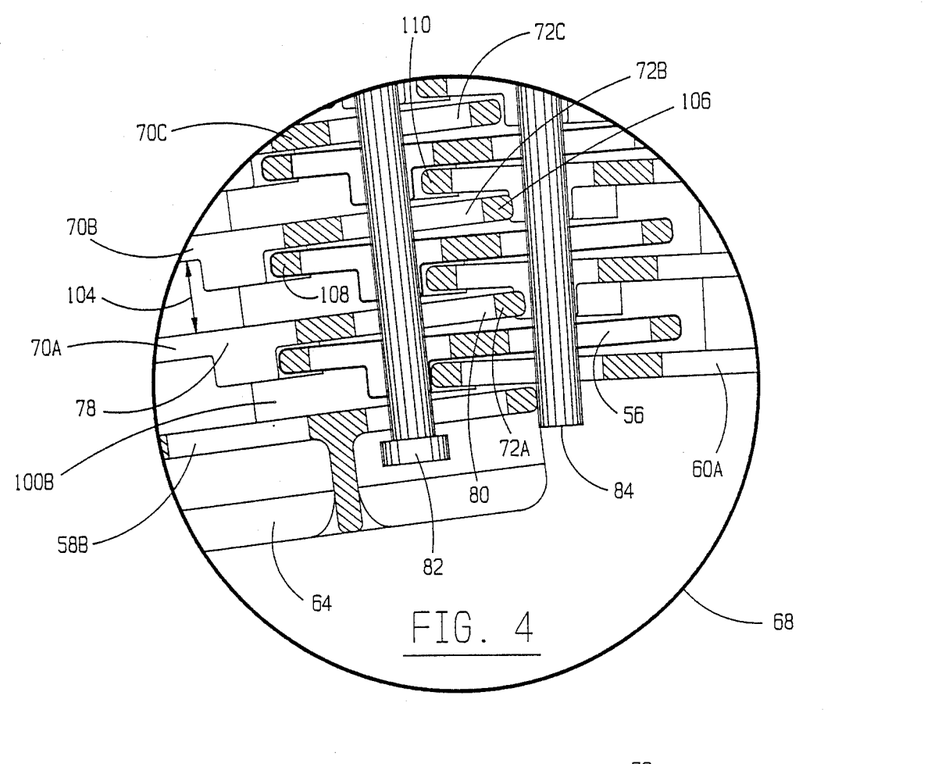
FIG. 4 is a top sectional view of a portion of FIG. 3.

As shown, plane 66 pases through the right hand side of modules 58B, 62 and 60A. A selected portion of those three modules as indicated by circle 68 is viewed in cross-section and is illustrated in FIG. 4. Common structure of the modules shown in FIG. 3 which are also illustrated or shown in FIG. 4 and subsequent FIGS. will where possible use common reference numbers. Referring now to FIG. 4 there is shown the partial cross-sectional view taken along plane 66 of FIG. 3. To aid in understanding and to avoid confusion, the module 56 includes some shading whereas modules 58B and 60A do not include shading.

Figure 5:
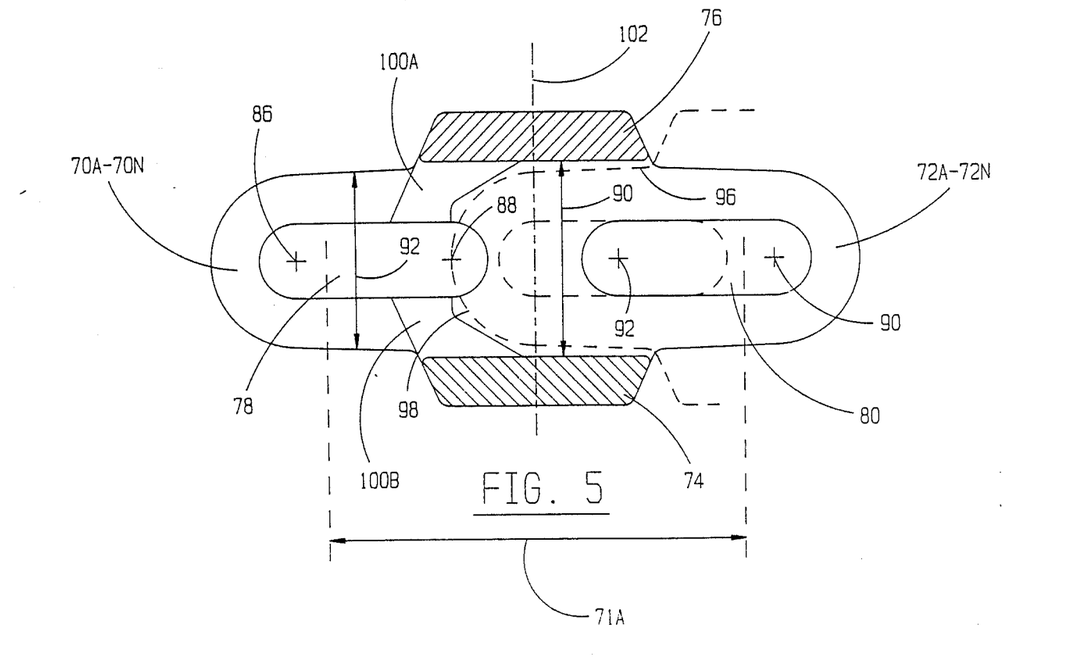
FIG. 5 is a side view of one of the modules of FIG. 3.

Referring again to FIG. 3 in combinations with FIGS. 4 and 5 the intermeshing and operation of one embodiment of modules comprising a belt of this invention can be seen. As shown in these Figures each module such as 58B, 56 and 60A include first and second pluralities of link ends such as link ends 70A, 70B, 70C through 70n which represent a portion of a first plurality of link ends of modules 58B. In a similar manner and as is more clearly visible in FIG. 4, link ends 72A, 72B, 72C thru 72n located on the opposite side of the module from their corresponding link ends 70A through 70n comprise a second plurality of link ends. In the embodiment shown in FIG. 3, each of the corresponding link ends such as link end 70A in the first plurality and link end 72A in the second plurality are molded with an intermediate portion, such as the intermediate portion indicated by double-headed arrow 71A to form an elongated link which extends between the two pivot holes. These first and second pluralities of link ends or alternately as in the embodiment of FIG. 3, these elongated links are joined or held together by a connecting structure. As is illustrated more clearly for the particular embodiment being discussed in FIGS. 3 and 5, the connecting structure is shown as transverse top and bottom members 74 and 76. Each link end of the first plurality of link ends defines a pivotal aperture 78. Similarly, each link end of the second plurality of link ends also define an aperture such as aperture 80. The plurality of apertures defined in each of the first and second pluralities of link ends, are arranged along first and second pivot axis respectively. Further, as is clearly shown in FIGS. 3 and FIG. 4 both of the pluralities of link ends are suitable for being intermeshed and pivotally connected such as by pivot rods 82 and 84 to similar modules. Thus as can be seen pivot rod 82 interconnects modules 58A and 58B with module 56 and pivot rod 84 interconnects modules 60A and 60B to module 56. Thus, by pivotally connecting a multiplicity of modules in the manner described a conveyor belt may be formed. In this preferred embodiment illustrated, it can be seen that both apertures 78 and 80 are elongated to form a slot in which the respective pivot rods such as pivot rod 82 can move if necessary between two extreme positions indicated in slot 78 as positions 86 and 88. As will be seen hereinafter with respect to a discussion of another embodiment of the present discussion, it is only necessary however, that one of the pivot apertures be elongated to form a slot. It will also be appreciated that when a conveyor belt constructed of modules such as shown in FIG. 3 is travelling under tension and in a straight path, the pivot rods will be at their outermost position in the slots such as position 86 in slot 78 and position 90 in slot 80. Of course when travelling in a straight line under tension, the conveyor belt and modules perform and operate in a manner similar to typical modular plastic conveyor belts now commercially available. When the pivot rods are at position 86 in slot 78 and position 90 in slot 80 they are at the most extended position which represents the "nominal pitch" of the conveyor belt. However as will be appreciated by those skilled in the art, to make a horizontal turn or to flex in a horizontal direction, it is necessary that the "pitch" of the belt be smaller at the inside of the turn than it is at the outside of the turn. To accomplish this, the inside of the belt must collapse on itself such that the pitch diameter is decreased between the inner most connected link ends. It will also be appreciated of course that the greater the pitch change that occurs between the inner most link ends, and the outer most link ends of a turn the smaller the turning radius can be. To date, the minimum inside turning radius, using a single belt, is about 2.2 times the total width of the belt, and no commercial belts are known with an inside turning radius less than 2 times the width of the belt. However, smaller ratios have been achieved by using two or more different belts side-by-side wherein each of the side-by-side belts have a different pitch. The Ashworth "Small Radius Composite Belt" which has an inside turning radius to width ratio of 1.1 is an example. Thus, a 3 foot wide single belt would have an inside turning radius of 6.6 feet and an outside radius of 9.6 feet (the inside turning radius of 6.6 feet plus the width of the belt of 3 feet). According to the teachings of this invention however, a single belt having a turning radius of about 1.1 times the width of the belt can be achieved with an embodiment such as that shown in FIGS. 3, 4 and 5, and all of the embodiments described herein can readily achieve a minimum turning radius of 2.2. For a three foot belt built according to the embodiment of FIG. 3, the inside turning radius would be 3.3 feet, and the outside radius would be 6.3 feet (the inside turning radius of 3.3 feet plus the three foot width of the belt). To achieve this improvement in the minimum turning radius, it is important to understand that the transverse members or connecting structures are located and integrally molded with the plurality of link ends such that the end most portion of a link end can move past at least a portion of the connecting structure. More specifically as shown in FIGS. 3, 4, and 5, the link ends move past by moving between the two transverse members 74 and 76. This is accomplished by molding the height of the link end such as is indicated by double-headed arrow 92 somewhat smaller than the inside spacing between the top amd bottom transverse members 74 and 76 as indicated by double- headed arrow 94. In fact, as is more clearly shown in FIG. 5 the link end of a connecting module as shown by the phantom link end 96 (indicated by dashed lines)can pass between the transverse members 74 and 76 until the end portion of phantom link end 96 contacts the spacer member 100A and 100B. The endmost portion 98 of phantom link end 96 is also substantially past the center line 102 of the module as is clearly seen in FIG. 5.

In the embodiment shown in FIGS. 3, 4 and 5, it should also be noted that the spacing between adjacent link ends such as is indicated by double-headed arrow 104 between link ends 70A and 70B of FIG. 4 is somewhat greater than twice the thickness of a link end. This wide spacing is necessary to achieve the small turning radius achieved by this invention since when the pitch is at a minimum size during a turn the end-most portion of a link end (such as endmost portion 106 of link end 72B of module 58B) must move past the endmost portion of a link end of a module not directly pivotally connected to module 58B (such as link end 110 of module 60A). Thus, it is seen that there must be sufficient space between adjacent links of a module to allow link ends intermeshed between the adjacent links to overlap. In addition, as will also be appreciated by one skilled in the art, there must also be sufficient spacing such that the intermeshed link ends of the modules can be at an angle one with the other so as to achieve the turn.

It should be understood that the embodiment discussed with respect to FIGS. 3, 4 and 5, as well as other embodiments discussed hereinafter wherein the end most portion of link ends of modules not directly pivotally connected move past each other are constructed such that rows of modules are in repetitive groups of three That is, the link ends of all of the "first" rows of modules are aligned, but are not aligned with any of the link ends of the "second" or "third" rows. In a similar manner, the link ends of the "second" rows are only aligned with link ends of other "second" rows, and the link ends of the "third" rows are only aligned with link ends of other "third rows". This three row repetitive pattern is substantially different from all presently availably "Radius" or horizontal flexing belts wherein the alignment of every row of modules is the same. It is also different from other plastic modular belts, including the belt taught in FIG. 4 of the U.S. Pat. No. 3,870,141 J. M. Lapeyre which teaches a "two row" repetitive pattern. Although the actual spacing between the adjacent links of a module is not critical, to maintain strength and allow sufficient space such that the overlapping link ends may be at an angle with each other it has been found that a spacing of about twenty percent greater than the combined thickness of the two link ends is preferred.

Figure 6A:
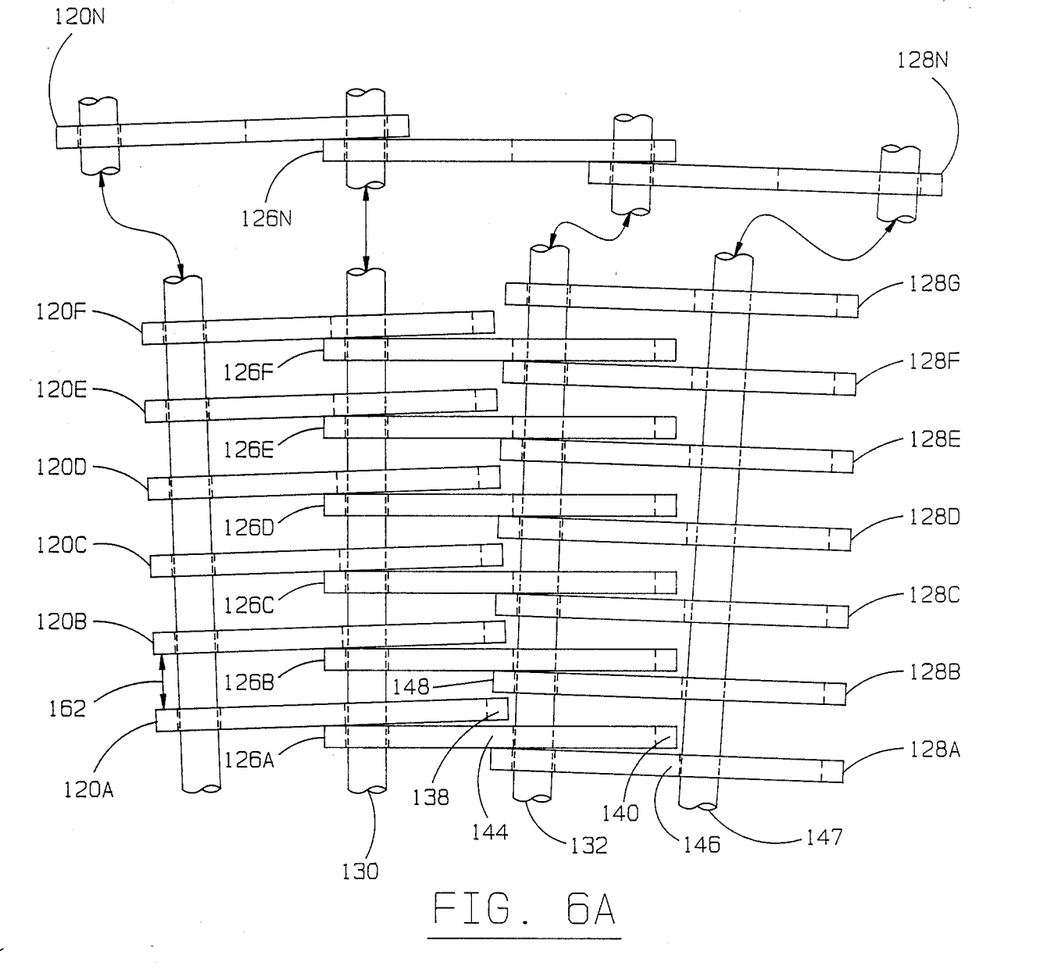
FIGS. 6A and 6B a side cross-sectional view and a top view sketch respectively of another embodiment of this invention.
Figure 6B:
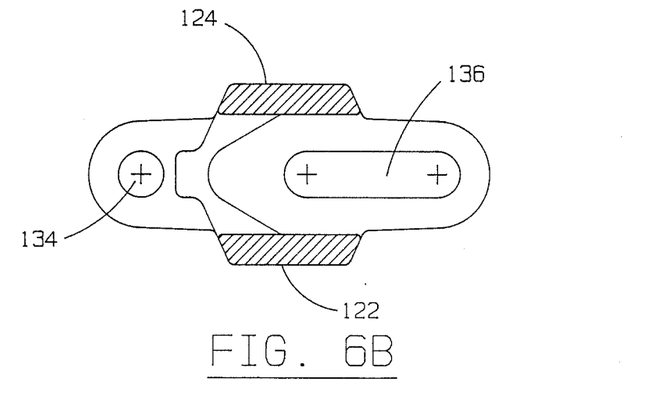

Referring now to FIGS. 6A and 6B there is shown a top sketch and a side view respectively which illustrate another embodiment of the present invention. This embodiment is substantially similar to that discussed with respect to FIGS. 3, 4 and 5, except the turning radius of a belt constructed from this type module is not quite as small as that of the embodiment of FIGS. 3, 4 and 5. It is also clear, that the modules of a belt constructed from modules such as shown in FIGS. 6A and 6B also has a three row repetitive pattern. It should be noted that the top view sketch of FIG. 6A has been simplified for explanation purposes such that the connecting structure that joins the elongated links and the spacers are not shown. However, it should be understood that a module is made up of the various links 120A, 120B, 120C to 120n, which are joined by a connecting structure such as for example the traverse cross-members 122 and 124 shown in FIGS. 6B. In a similar manner, the links identified as 126A, 126B through 126n represent a second connected module and links 128A through 128n represent a third module joined by connecting structure such as the traverse members 122 and 124 in FIGS. 6B. These three modules also represent one each of the "three row" repetitive pattern. Also in a manner that was discussed with respect to FIG. 4 heretofore, pivot rod 130 pivotally connects a module with link ends 120A through 120n with the module 126A through 126n. In a similar manner, pivot rod 132 pivotally connects the module 126A through 126n to module 128A through 128n. Referring now to FIG. 6B, it can be seen that the cross-sectional view of the module in FIG. 6B is substantially the same as the modules discussed with respect to FIG. 5 except the pivot aperture 134 shown in the cross-sectional link of FIG. 6B is circular, and is not elongated as was the aperture 78 shown in FIG. 5. Also, it should be noted that the elongated aperture 136 of FIG. 6B is somewhat more elongated than the aperture 80 shown in FIG. 5. Comparing the top three elements or links 120n, 126n and 128n shown in FIG. 6A with the links at the extreme left hand side of the module shown in FIG. 3, and assuming the nominal pitch diameters of the two belts are the same, it will be appreciated that the pitch of the belt at the outside of the radius turn will be the same for both embodiments. However, as mentioned above, it can be seen that the minimum pitch between the inner-most pivotally connected link ends is not as small in the embodiment of FIG. 6A as the pitch between the inner-most link ends of FIG. 4. The reason of course that the embodiment of FIGS. 6A and 6B cannot have a turn radius as small as that of the embodiment of FIGS. 2, 4 and 5, is because the pivot rods operate in one elongated aperture and one circular aperture rather than two elongated apertures. This is more clearly shown in FIG. 6A where it can be seen that the right hand most portion 138 of link 120A abuts pivot rod 132 and cannot move further to the right. In a similar manner, the right hand most portion of link 126A abuts pivot rod 142 and cannot move further to the right. However, it should be noted that the maximum collapse or the ratio of the belt width to the inside turning radius in the design of FIG. 6A will still be approximately 1.7 which allows a substantially less turning radius or smaller turning radius than the conventional 2.2. This improved turning radius it will be appreciated, is achieved by the fact that the end 138 of link 120A passes between the top and bottom connecting structures or traverse members 124 and 122 respectively, and is able to go past the center line 144 of link 126A. In a like manner, the end 140 of the module composed of links 126A through 126n also passes between its traverse member and is able to go past the center line 146 of the module composed of links 128A through 128n. In fact, in the present embodiment to achieve the 1.7 turning ratio it will be noted that end 138 not only passes the center line of its pivotally connected module but also passes end portion 148 of the module composed of links 128A through 128n.

Figure 7:
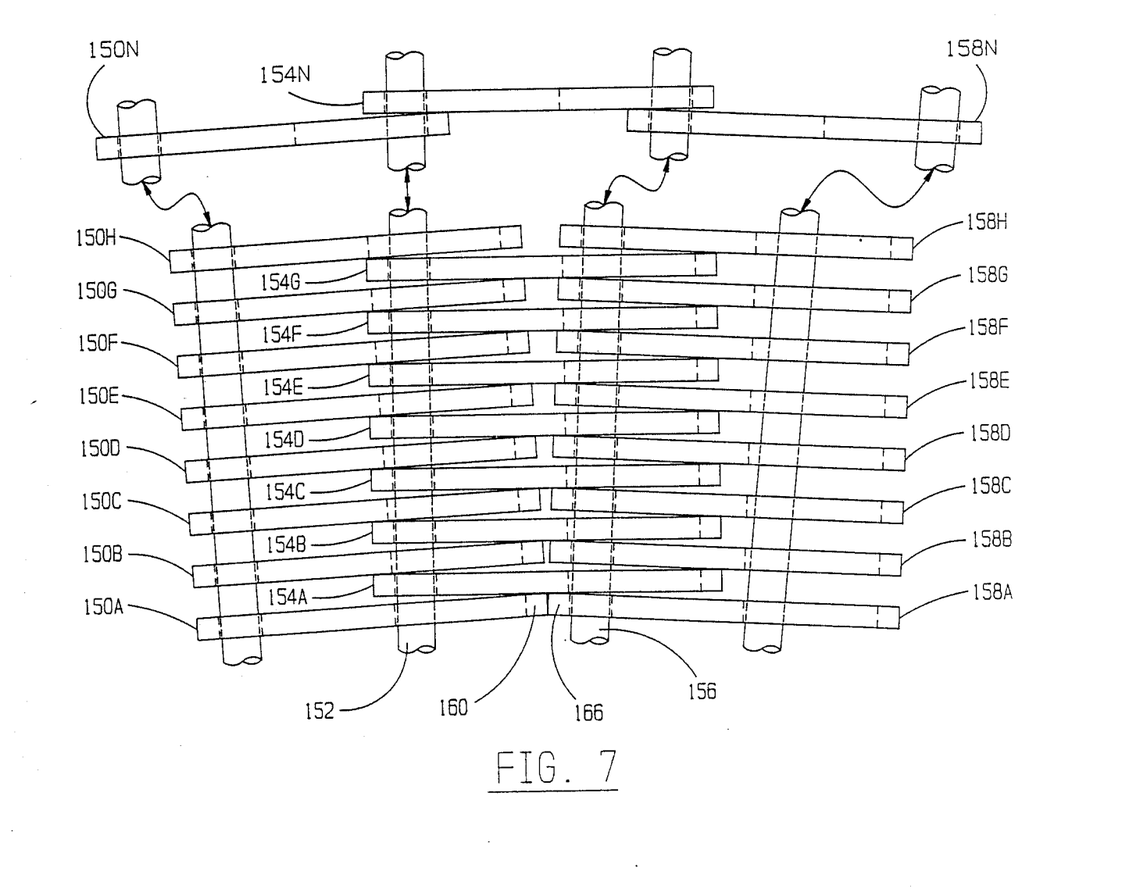
FIG. 7 is a variation of the embodiment shown in FIGS. 6A and 6B wherein the adjacent pivot ends have a closer spacing.

Referring now to FIG. 7, there is shown still another embodiment incorporating features of the present invention. As shown, the modules comprised of link elements 150A through 150n is pivotally connected by pivot rod 152 to the module comprised of link elements 154A through 154n. In a similar manner, the module comprising link elements 154A through 154n is pivotally connected by means of pivot rod 156 to the module comprised of link elements 158A through 158n. If the cross-sectional view of a module comprising a belt such as that shown in FIG. 7 is the same as that shown in FIG. 6B it will be appreciated that the only difference in the module is that the spacing indicated by double-headed arrow 160, between adjacent link elements such as link elements 150A and 150B is substantially less than the spacing between adjacent elements 120A and 120B of FIG. 6A indicated by double-headed arrow 162. Although the embodiment shown in FIG. 7 does not have as small a turning radius as that of the embodiment of FIG. 6A, it will be appreciated that the turning radius will be between about 2.0 and 2.1, and is still smaller than that presently available with existing single belts. This small turning radius which is smaller than that presently available is achieved by the fact that even though the outer-most portion of the link ends such as portion 164 of link 150A and portion 166 of link element 158A cannot pass each other, they can and do contact or abut each other at the minimum turn diameter of the belt. This is unlike prior art belts wherein the structure or traverse member connecting the individual links or link ends of each module prevents such contact. However, unlike the previously discussed embodiments a belt comprised of modules with the spacing between adjacent link ends has a two-row repetitive pattern rather than a three-row repetitive pattern.

Figure 8:
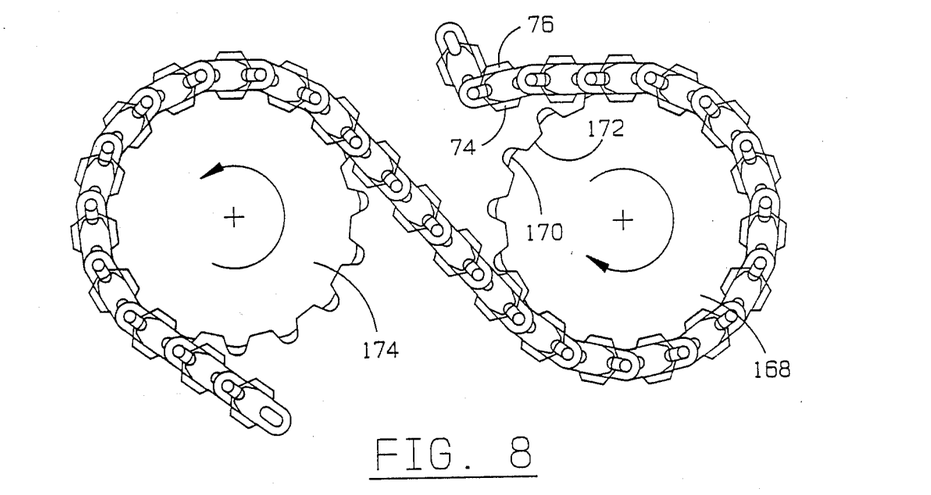
FIG. 8 shows a side view of a belt of this invention being driven on both the top and bottom surface by a pair of sprockets.

Referring again to FIG. 1, it will be recalled that sprockets 24, 38 and 40 were indicated as being used as drive sprockets. In addition, drum 28 often provides some drive power to move the belt in its predetermined path. If used to provide drive, drum 28 will provide driving forces to belt 20 by means of a frictional contact between the drum and the edges of the belt such as edge 64 shown in FIG. 3. However, a drive source such as drum 28 is not typically used as the driving force which moves the belt along its predetermined path. In most cases, the driving forces are provided by drive sprockets such as the drive sprockets shown figuratively in FIG. 1 as 24, 38 and 40. Referring now to FIG. 8 along with FIGS. 3, 5 and 6B, there is shown a particularly satisfactory drive sprocket arrangement for the modules described heretofore. As shown in FIG. 8, drive sprocket 168 includes a multiplicity of teeth such as tooth 170, and, a multiplicity of recesses such as recess 172. As shown in this figure, a belt comprised of modules such as those modules shown in FIG. 3 and FIG. 5, receives driving power by the fact that the bottom transverse member 74 acts as a tooth which is received by the recess 172 of sprocket 168. Thus, as the sprocket provides a force at least having a vector which is orthogonal to the direction of travel, the belt will be propelled in the desired direction. Another advantage of the embodiment shown in FIG. 8 is achieved by the symmetry of a conveyor belt composed of modules such as shown in FIG. 3 and FIG. 5. As shown, the top transverse member 76 of a module will become the driving tooth after the belt passes sprocket 168 and continues on its way to sprocket 174. Thus, it can be seen that a belt composed of modules such as those shown in FIGS. 3 and 5 can be driven from either the top surface or the bottom surface by means of the traverse members. Referring to FIG. 6B, it will also be appreciated that the embodiments shown in FIGS. 6A and 7 which have a cross-sectional such as shown in FIG. 6B can also be driven by a sprocket arrangement similar to that shown in FIG. 8. Thus, all the belt embodiments discussed to this point can be driven from both the top and bottom surfaces of the belt.

Figure 9A:
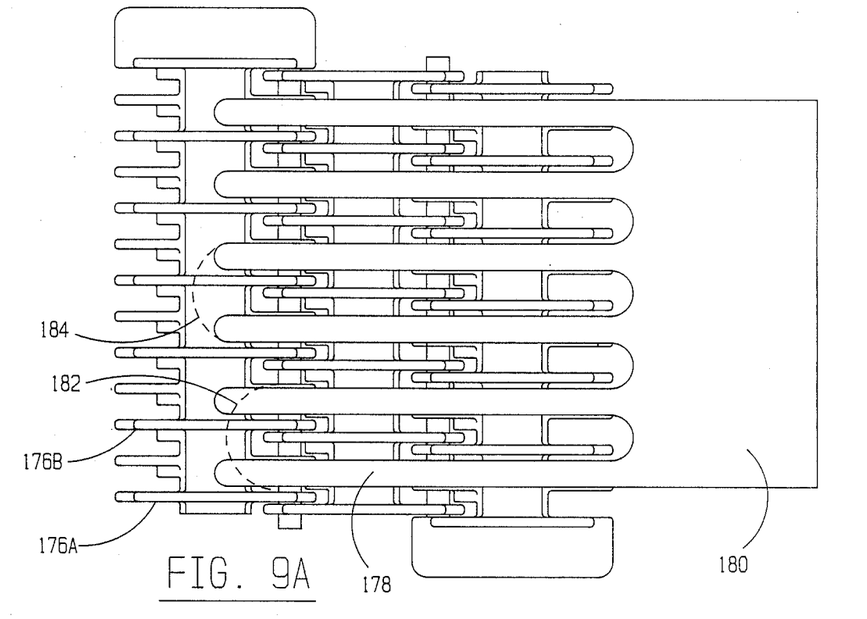
FIGS. 9A, 9B and 9C show a top view, a side view and a cross-sectional view of a variation of the embodiment of the belt of FIG. 2 which cooperates with a transfer comb for transferring objects to and from the belt invention.
Figure 9B:
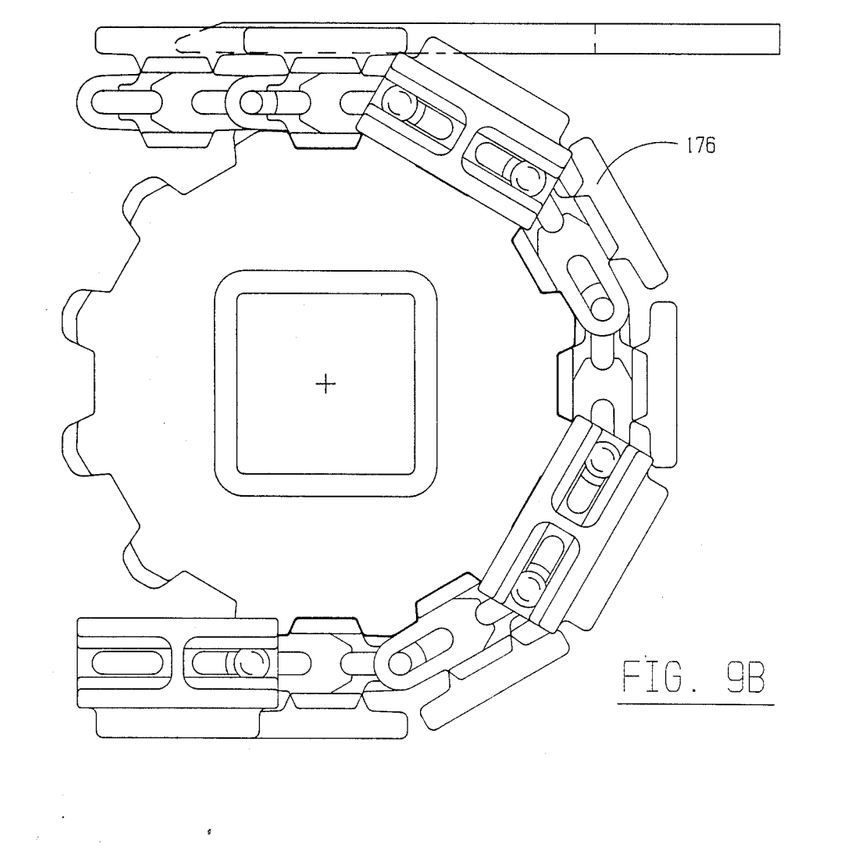
Figure 9C:
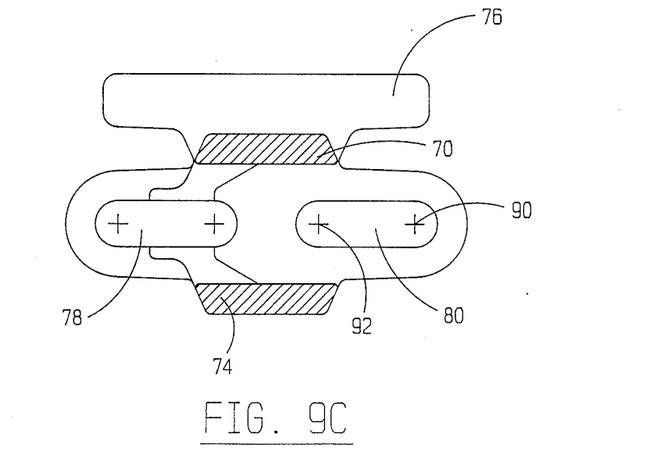

Referring now to FIGS. 9A, 9B and 9C, there is shown respectively a top view, a side view, and a cross-sectional view of another module embodiment. As shown in these figures, and especially as shown in FIGS. 9B and 9C, it can be seen that the modules comprising this belt are substantially the same as the module shown in FIGS. 3 and 5 except it has in addition thereto on every other link of each module a top structure extension 176 which serves as a rib to create channels for the teeth of a transfer comb such as tooth 178 of a comb 180. This arrangement is shown more clearly in FIG. 9A. It would also, of course, be possible to mold the modules so that only one out of every four links includes the top structure extension. Such an arrangement, however, would require the modules to be built without the top structure extension 176B shown in FIG. 9A, and would permit a much wider tooth on comb 180 such as teeth 182 and 184 indicated by dashed lines in FIG. 9A. As will be appreciated by those skilled in the art and as more completely discussed in the applicant's earlier '949 patent. The cooperation of the teeth 178 of comb 80 with the raised ribs allows for greatly improved transfer of products to and from a belt comprised of such modules. It will be understood of course that the transfer comb of a belt such as that shown in FIG. 9A will be located in a portion of the belt that is on a straight run and not during a horizontal curve. Due to the addition of the top structure extension, the drive force of the belt will typically only be applied to the bottom structure or bottom transverse member of the module. However, it should be understood that a drive sprocket could be used to drive the belt at the top surface so long as the width of the drive sprocket is able to fit between the raised ribs of a module.

Figure 10:
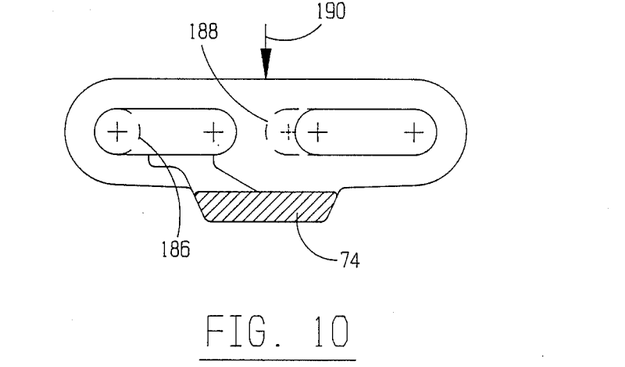
FIG. 10 another embodiment of a conveyor belt module of this invention.

Referring now to FIG. 10, there is shown still another embodiment of the present invention wherein the modules have substantially the same structure as that shown in FIG. 4 or FIG. 6A (the FIG. 6A structure is indicated by dashed lines 186 and 188) except, the top transverse member is not included and only the bottom transverse member 74 is used as the connecting structure between the plurality of links. It should be appreciated by one skilled in the art, that although a belt made of modules having a cross-section similar to that shown in FIG. 10 will be substantially as strong in tension and suitable for most operations as that of a belt such as shown in FIG. 5, without sufficient bottom support, it will not be as good at resisting bending loads indicated by the heavy arrow 190 which are applied to the top surface of the belt. Also, the belt similar to that of FIG. 10, will be capable of being driven only from the bottom side of the belt.

Figure 11:
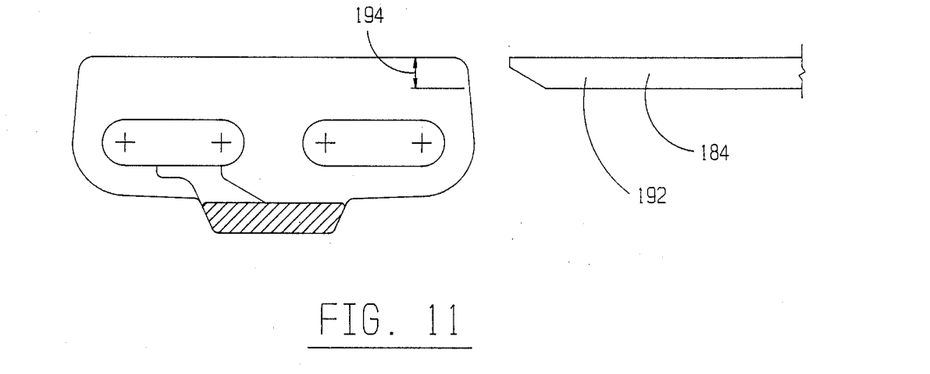
FIG. 11 is a variation of the belt of FIG. 10 suitable for cooperating with a transfer comb to transfer objects to and from the conveyor belt.

FIG. 11 shows how the teeth 192 of a transfer comb may also operate with a variation of the embodiment shown in FIG. 10. As shown, the top portion of selected ones of the elongated links is extended or raised as indicated by double-headed arrow 194 so as to create channels for receiving the teeth 192 of a transfer comb. It will be understood by one skilled in the art that as was shown in FIG. 9A and discused above, the extended or raised portion is not necessarily added to everyone of the elongated links. Preferably, the extended or raised portion would be added to every other link, or perhaps one out of every four links of a module. It will also be clear of course that the raised portion could also be added to every fourth link but such construction would provide less support for the carried product.

It should be appreciated also that modules such as those shown in FIGS. 10 and 11 will permit the manufacture of a thinner belt which is sometimes desirable depending upon the design of the conveyor.

Figure 12:
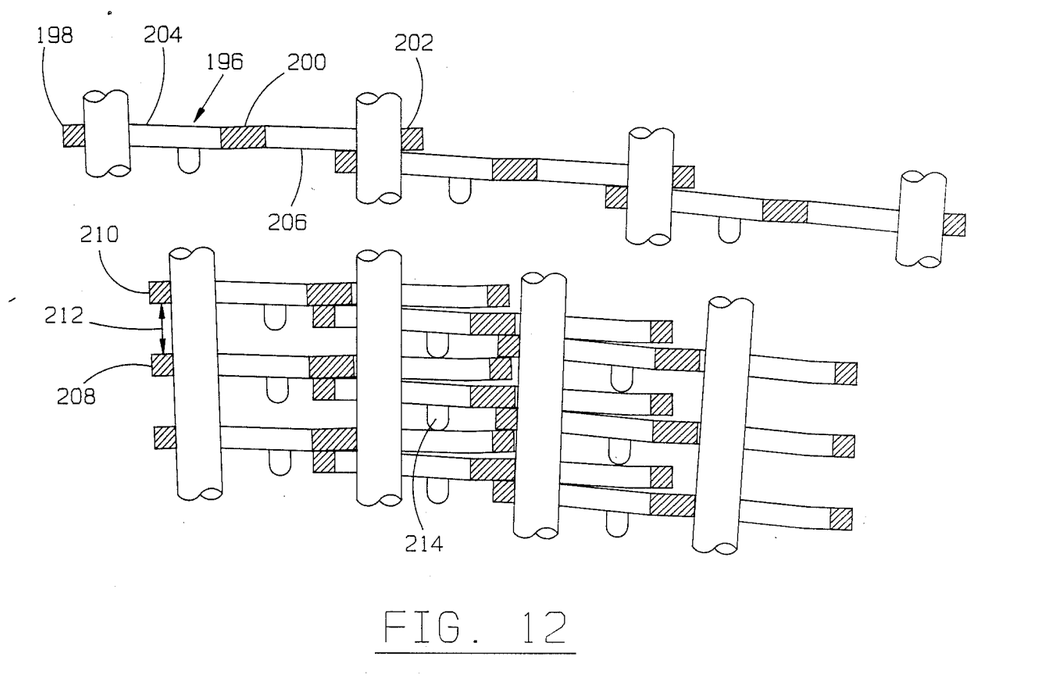
FIGS. 12 and 13 illusrate still another embodiment of this invention wherein the first and second pluralities of link ends of a module are not in-line, but are offset.

Referring now to FIG. 12, there is shown a top view schematic of still another embodiment of the present invention. As shown in this figure, it can be seen that there is a substantial similarity to the embodiments already discussed and especially to that shown in FIG. 6A, except that instead of a single inline link between the two remote end portions, the elongated link of this embodiment does not run in a straight line between the two link ends. As shown, the elongated link 196 angles from link end 198 to a straight portion 200 and then angles again between straight portion 200 to the right hand link end 202. That is, the elongated links include portion 204 and 206 between straight portions 198, 200 and 202 which do not run orthogonal to the parallel first and second pivot axes. In addition the spacing between adjacent link ends such as link ends 208 and 210 such as indicated by double-headed arrow 212 may need to be somewhat greater for this embodiment of FIG. 12 than the embodiment shown in FIG. 6A. The operation of a conveyor belt comprised of modules having such a struction such as that shown in FIG. 12 is substantially the same as that discussed heretofore with respect to FIG. 2. Further, as the belt modules collapse into themselves in a turn, the modules must slide along the pivot rod to allow such collapse which it is believed will provide a cleaning action to the pivot rod and thereby aid in keeping the belt more sanitary. Spacer 214 as shown in the embodiment of FIG. 12 which maintain the proper spacing between pivotally conected modules may also serve as a cam member to help guide or slide the links along the pivot rod. Although not shown, the various variations in alternate embodiments discussed heretofore, may be incorporated with the offset link construction such as shown in FIG. 12. As an example, as shown in FIGS. 9A, 9B and 9C, a belt having the modular construction of FIG. 12 may also have added thereto a raised rib structure for receiving the teeth of a transfer comb for transferring objects to and from the belt.

Figure 13:
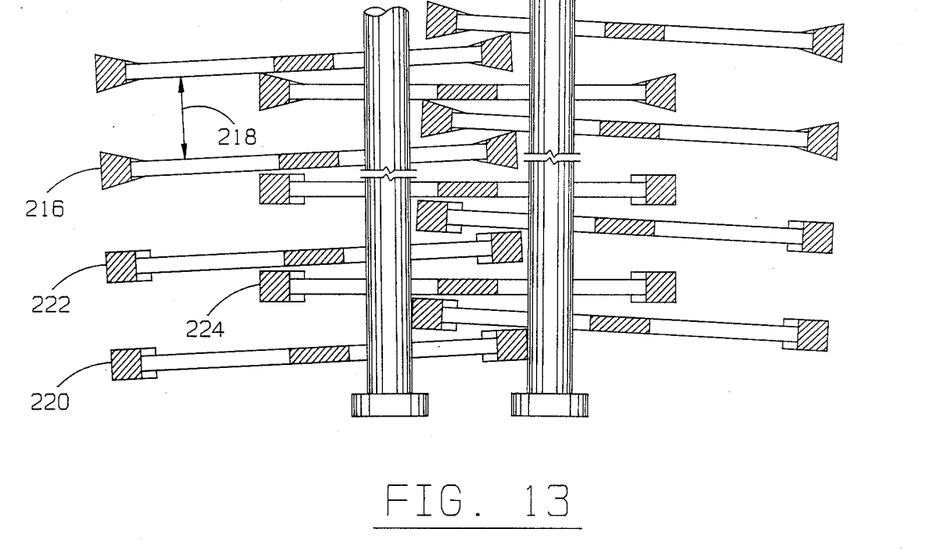

Referring to FIG. 13, it can be seen that the width of a portion of a link end which contacts the pivot rod may be increased to provide a larger bearing area, such as portion 216. However, the minimum inside turn radius can still be achieved as long as the space 218 between adjacent links at the point of the pivotally connected link ends pass is at least twice that of the link at its wide part 208. As shown the increased width of the link ends may have a dove-tail shape as shown, or could take other shapes such as the rectangular link ends 220, 222 and 224 shown in the bottom portion of the Figure.

Thus, although there has been described to this point particular embodiments of modules and conveyor belts which can flex or change horizontal direction, it is not intended that such specific references be considered as limitations upon the scope of this invention except insofar as is set forth in the following claims which are intended to cover the spirit of the invention as well as specific embodiments.

I claim:

1. A module having a top and bottom surface and suitable for being pivotally connected with a multiplicity of similar modules by pivot rods to construct a conveyor belt which can move along a predetermined path, including a horizontally curving path that changes in a lateral direction, said module comprising:

first and second pluralities of link ends joined by a connecting structure integrally molded to one of said bottom and top surfaces, said link ends of said first plurality defining pivotal apertures arranged along a first pivot axis and said link ends of said second plurality defining pivotal apertures arranged along a second pivot axis, each plurality of link ends suitable for being intermeshed and pivotally connected by pivot rods with link ends of a to form a conveyor belt;

the pivotal apertures defined in each link end of at least one of said first and second pluralities being elongated; and said connecting structure joining said link ends being integrally molded with at least one of said first and second pluralities and located such that the end most portion of a link end of one of said modules pivotally connected to said first and second pluralities of link ends can move past at least a portion of said connection structure and past the mid point of said module so as to allow a belt formed by a multiplicity of modules to flex in a lateral direction.

2. The module of claim 1 wherein adjacent link ends of each plurality are spaced such that the end most portion of a link end of said module pivotally connected to said first plurality of link ends and the end most portion of a link end of said another module pivotally connected to said second plurality of link ends can move past each other.

3. The module of claim 2 wherein the apertures defined in both of said first and second pluralities are elongated.

4. The module of claim 1 wherein said connecting structure further being located such that said end most portion of a link end of a connected module can move past the mid-point of said module.

5. A module having a top and bottom surface and suitable for being pivotally connected with a multiplicity of similar modules by pivot rods to construct a conveyor belt which can move along a predetermined path, including a horizontally curving path that changes in a lateral direction, said module comprising:

first and second pluralities of link ends joined by a connecting structure integrally molded to one of said bottom and top surfaces, said link ends of said first plurality defining pivotal apertures arranged along a first pivot axis and said link ends of said second plurality defining pivotal apertures arranged along a second pivot axis, each plurality of link ends suitable for being intermeshed and pivotally connected by pivot rods with link ends of a similar module to form a conveyor belt and said first and second pivot axes defining a common plane;

the pivotal apertures defined in said link end of at least one of said first and second pluralities being elongated; and said connecting structure joining said link ends being integrally molded with at least one of said first and second pluralities and being spaced sufficiently from said common plane such that the end most portions of link ends of said modules pivotally connected to said first and second pluralities of link ends can move past at least a portion of said connection structure and substantially to the mid point of said module such that said end most portions may contact each other so as to allow a belt formed by a multiplicity of modules to flex in a lateral direction.

6. The module of claims 1 or 5 wherein said connecting structure comprises a transverse member integrally molded with the bottom surface of said module.

7. The module of claim 6 and further including a second transverse member integrally molded to the top surface of said module.

8. The module of claim 6 wherein said member molded to the bottom surface is suitable for receiving a driving force to move said module along said predetermined path.

9. The module of claim 1 wherein a link end in said first plurality has a corresponding link end in said second plurality.

10. The module of claim 1 wherein link ends of said first plurality have a corresponding link end in said second plurality, and further comprising a plurality of intermediate portions joining said corresponding link ends of said first and second pluralities to form a plurality of elongated links, each one of said plurality of elongated links including a link end in said first plurality, an intermediate portion, and a link end in said second plurality.

11. The module of claim 1 or 5 and further including a raised portion integrally molded to the top surface of said first and second pluralities of link ends said raised portion defining channels parallel to the predetermined path of said module for receiving the teeth of a comb to remove articles from said module.

12. A module having a top and bottom surface suitable for being pivotally connected with a multiplicity of similar modules by pivot rods to construct a conveyor belt which can move along a predetermined path, including a path that changes lateral direction, said module comprising:
a plurality of elongated links extending the length of the module, each of said plurality of elongated links defining a first set of elongated pivot holes aligned along a first pivot axis in the link ends at one end and a second set of elongated pivot holes aligned along a second pivot axis in the link ends at the other end of said elongated link;
the link ends of each link of said module suitable for being intermeshed and pivotally connected by pivot rods extending through said pivot holes with the link ends of a similar module to form a conveyor belt; and one of said bottom and top surfaces of said module including L connecting structure integrally molded thereto and which extends transverse to said elongated links and is located in a maner such that the end most portion of link ends of modules pivotally connected to opposite ends of said elongated link may move past each other and said connecting structure of said module so as to allow a belt formed with a multiplicity of such modules to flex in a lateral direction.

13. The module of claim 5 wherein the minimum spacing between adjacent link ends of said first and second pluralities being no less than about 1.2 times the thickness of a link end.

14. The module of claim 12 wherein the spacing between adjacent link ends is no less than about 1.2 times the combined thickness of the two link ends moving past each other.

15. The module of claims 1 or 12 and further including another connecting structure integrally molded to the other one of said bottom and top surfaces.

16. A module of claim 12 wherein said connecting structure molded to the bottom surface of said module is suitable for receiving a driving force to move said module along a predetermined path.

17. The module of claims 10 or 12 wherein every other one of the elongated links further include an integrally molded raised portion having a top surface which defines a plane above the plane of the top surface of the other elongated links thereby providing channels for receiving the teeth of a comb to remove articles from said module.

18. The module of claim 1 or 12 wherein the end most portion of selected link ends have a thickness which is greater than the thickness of the other portion of said link ends.

19. The module of claim 5 wherein link ends of said first plurality have a corresponding link end in said second plurality, and further comprising a plurality of intermediate portions joining said corresponding link ends of said first and second pluralities to form a plurality of elongated links, each one of said plurality of elongated links including a link end in said first plurality, an intermediate portion, and a link end in said second plurality.

20. The module of claims 10, 12 or 19 wherein one out of three of the elongated links further include an integrally molded raised portion having a top surface which defines a plane above the plane of the top surface of the other elongated links thereby providing channels for receiving the teeth of a comb to remove articles from said module.

21. The module of claim 10, 12 or 19 wherein said elongated links comprise first and second groups, said elongated links of said first group having upper surfaces which define a plane above the upper surface of said second group so as to form a plurality of channels for receiving the teeth of a comb to remove articles from said modules.

22. The module of claim 12 and further including means integrally molded to the top surface of said elongated links, said means defining channels parallel to said elongated links for receiving the teeth of a comb to remove articles from said module.

23. The module of claims 1 or 12 and further comprising a spacer integrally molded to a side surface of selected link ends, said spacer having a thickness no less than the thickness of said link ends and being located so as to maintain a relative spacing between pivotally connected link ends and to facilitate the movement of link ends past each other.

24. The module of claims 10, 12 or 19 wherein said elongated links include a portion thereof which is not orthogonal to said pivot axis.

25. A conveyor belt suitable for flexing in a lateral direction, and for moving along a predetermined path comprising:
a multiplicity of pivot rods;
a multiplicity of modules each having a top and bottom surface and first and second pluralities of link ends joined by a connecting structure integrally molded therewith, said link ends of said first plurality defining pivotal apertures arranged along a first pivot axis and said link ends of said second plurality defining pivotal apertures arranged along a second pivot axis, each plurality of link ends of each of said multiplicity of modules intermeshed and pivotally connected by one of said multiplicity of pivot rods to one of said plurality of link ends of another one of said multiplicity;

the pivotal apertures defined in each link end of at least one of said first and second pluralities being elongated; and said connecting structure joining said link ends being integrally molded with at least one of said first and second pluralities and located such that the end most portion of a link end of one of said modules pivotally connected to said first and second pluralities of link ends can move past at least a portion of said connecting structure and past the mid point of said module so as to allow flexing of said belt in a lateral direction.

26. The conveyor belt of claim 25 wherein adjacent link ends of each plurality in a module are spaced such that the end most portion of a link end of a module pivotally connected to said first plurality of link ends between such adjacent link ends and the end most portion of a link end of a module pivotally connected to said second plurality of link ends also between such adjacent link ends can move past each other.

27. The conveyor belt of claim 25 wherein the apertures defined n both pluralities of link ends are elongated.

28. The conveyor belt of claim 25 wherein said connecting structure of said multiplicity of modules further being located such that said end most portion of a pivotally connected module can move past the midpoint of said modules.

29. A conveyor belt suitable for flexing in a lateral direction, and for moving along a predetermined path comprising:
a multiplicity of pivot rods;
a multiplicity of modules each having a top and bottom surface and first and second pluralities of link ends joined by a connecting structure integrally molded therewith, said link ends of said first plurality defining pivotal apertures arranged along a first pivot axis and said link ends of said second plurality defining pivotal apertures arranged along a second pivot axis, each plurality of link ends of each of said multiplicity of modules intermeshed and pivotally connected by one of said multiplicity of pivot rods to one of said plurality of link ends of another one of multiplicity and said first and second pivot axis defining a common plane;

the pivotal apertures defined in each link end of at least one of said first and second pluralities being elongated; and said connecting structure joining said link ends being integrally molded with at least one of said first and second pluralities and being spaced sufficiently from said common plane such that the end most portions of link ends of said modules pivotally connected to said first and second pluralities of link ends can move past at least a portion of said connecting structure and substantially to the mid point of said module such that said end portions may contact each other so as to allow flexing of said belt in a lateral direction.

30. The conveyor belt of claim 29 wherein said connecting structure of each module comprises a transverse member integrally molded to the bottom surface of each module.

31. The conveyor belt of claim 25 wherein a link end of a module n said first plurality has a corresponding link end in said second plurality.

32. The conveyor belt of claim 25 wherein link ends of said first plurality have a corresponding link end in said second plurality, and further comprising a plurality of intermediate portion joining said corresponding link ends of said first and second pluralities to form a plurality of elongated links, each one of said plurality of elongated links including a link end in said first plurality, an intermediate portion, and a link end in said second plurality.

33. A conveyor belt suitable for flexing in a lateral direction and for moving along a predetermined path comprising:
a multiplicity of pivot rods;
a multiplicity of substantially similar integrally molded modules each having a top surface and a bottom surface and a plurality of elongated links extending the length of the module, each of said plurality of elongated links defining a first set of elongated pivot holes arranged along a first pivot axis in the link ends at one end and a second set of elongated pivot holes arranged along a second pivot axis in the link ends at the other end of said elongated link;
the link ends of each module of said multiplicity intermeshd and pivotally connected by one of said multiplicity of pivot rods to the link ends of another one of said multiplicity; and
a connecting structure integrally molded to said bottom surface and extending transverse to said elongated links and being located in a manner such that the end most portion of link ends of modules pivotally connected to opposite ends of said elongated links may move past each other and at least a portion of said connecting structure of said module during lateral flexing of said belt.

34. The conveyor belt of claims 25 or 33 wherein said elongated links include a portion thereof which is not orthogonal to said pivot axis.

35. The conveyor belt of claim 25 wherein the minimum spacing between adjacent ones of each plurality of link ends of a module being greater than the maximum width of an intermeshed link end of a module pivotally connected between said adjacent ones of each plurality of link ends.

36. The conveyor belt of claims 33 or 35 wherein the spacing between adjacent link ends is no less than about 1.2 times the thickness of link ends, intermeshed between adjacent ones of said first and second pluralities of link ends.

37. The conveyor belt of claims 30 or 33 and further including a transverse member integrally molded to the top surface of said modules.

38. The conveyor belt of claims 30 or 33 wherein said member integrally molded to the bottom surface of a module is suitable for receiving a driving force to move said belt along said predetermined path.

39. The conveyor belt of claim 37 wherein said transverse member integrally molded to the top surface of said module is suitable for receiving a driving force to move said belt along said predetermined path.

40. The conveyor belt of claims 32 or 33 wherein one out of three elongated links further includes an integrally molded extension having a top surface which defines a plane above the plane of the top surface of the other longitudinal links thereby providing channels for receiving the teeth of a comb to remove articles from said belt.

41. The conveyor belt of claims 32 or 33 wherein every other one of said elongated links further include an integrally molded extension having a top surface which defines a plane above the plane of the top surface of the remaining elongated links thereby providing channels for receiving the teeth of a comb to remove articles from said belt.

42. The conveyor belt of claims 32 or 33 wherein said elongated links comprise first and second groups, said elongated links of said first group having upper surfaces which define a plane above the upper surface of said second group so as to form a plurality of channels for receiving the belt of a comb to remove articles from said belt.

43. The conveyor belt of claims 25 or 33 and further including means integrally molded to the top surface of said module, said means defining channels parallel to the predetermined path for receiving the teeth of a comb to remove articles from said belt.

44. The conveyor belt of claims 25 or 33 wherein said multiplicity of modules are bricklayed to form a conveyor belt having a width wider than the width of a single module.

45. The conveyor belt of claims 25 or 33 and further comprising a spacer located between selected intermeshed and parallel connected links, said spacer having a thickness no less than the thickness of said link ends and being located so as to maintain a selected position between said intermeshed link ends and to facilitate the movement of said link ends past each other.

46. The conveyor belt of of claim 45 wherein said spacer is integrally molded to selected ones of said first and second pluralities of link ends.

47. The conveyor belt of claims 25 or 33 wherein said multiplicity of modules are arranged in a repetitive pattern of first, second and third rows, and wherein the link ends of modules forming each first row are aligned, the link ends of modules forming each second row are aligned and the modules forming each third row are aligned.

* * * * *